United States Patent
Gringer

(10) Patent No.: US 6,568,087 B1
(45) Date of Patent: May 27, 2003

(54) SCRAPER WITH STOWABLE FILE

(76) Inventor: Donald Gringer, 800 Park Ave., New York, NY (US) 10021

( * ) Notice: Subject to any disclaimer, the term of this patent is extended or adjusted under 35 U.S.C. 154(b) by 0 days.

(21) Appl. No.: 10/021,841

(22) Filed: Dec. 13, 2001

(51) Int. Cl.[7] .............................. B26B 3/00; B26B 11/00
(52) U.S. Cl. .............................. 30/169; 30/172; 30/357; 7/158; 15/236.01
(58) Field of Search ...................... 7/158, 162; 30/169, 30/172, 353, 356, 357; 15/236.01, 236.05, 236.06, 236.07, 236.09

(56) References Cited

U.S. PATENT DOCUMENTS

| | | |
|---|---|---|
| 822,928 A | 6/1906 | Delano |
| 2,286,190 A * | 6/1942 | Abrahamsen ................ 30/357 |
| 2,783,537 A | 3/1957 | Gringer |
| 3,162,947 A | 12/1964 | Gringer |
| 4,089,076 A * | 5/1978 | Sparling ................ 30/172 |
| D274,952 S | 7/1984 | Gringer |
| 5,001,796 A * | 3/1991 | Desjardins ................ 30/172 |
| 5,337,442 A * | 8/1994 | Stewart ................ 15/236.01 |
| 5,467,498 A * | 11/1995 | Keegan et al. ........... 15/236.01 |
| 5,570,700 A * | 11/1996 | Vogeler ...................... 600/567 |
| D394,534 S | 5/1998 | Coulter |
| D396,910 S | 8/1998 | Henke |
| 5,829,082 A | 11/1998 | Moreira |
| 5,850,657 A | 12/1998 | List et al. |
| 5,953,820 A | 9/1999 | Vasudeva |
| 2002/0095737 A1 * | 7/2002 | Panifili et al. ........... 15/236.05 |

* cited by examiner

*Primary Examiner*—D. S. Meislin
(74) *Attorney, Agent, or Firm*—Lackenbach Siegel LLP

(57) ABSTRACT

A scraper has an arcuately contoured elastomeric molded over plastic ergonomic handle. The scraper handle has a proximate end slot and recess. A permanent rare earth magnet is fixedly disposed at the bottom wall of the recess. A ferro-metallic file is slidably disposed and seated in the recess with the file contactingly engaging the magnet. The handle is formed with a vertically disposed through hole so that the user can access the file and forcibly slidably remove the file to sharpen the scraper blade edge. The scraper has a 4-way blade, formed with two spoon shaped blades for fine scraping and two flat folded edges for rough scraping. All four edges are ground to the same large radius. The scraper is a pull scraper.

7 Claims, 3 Drawing Sheets

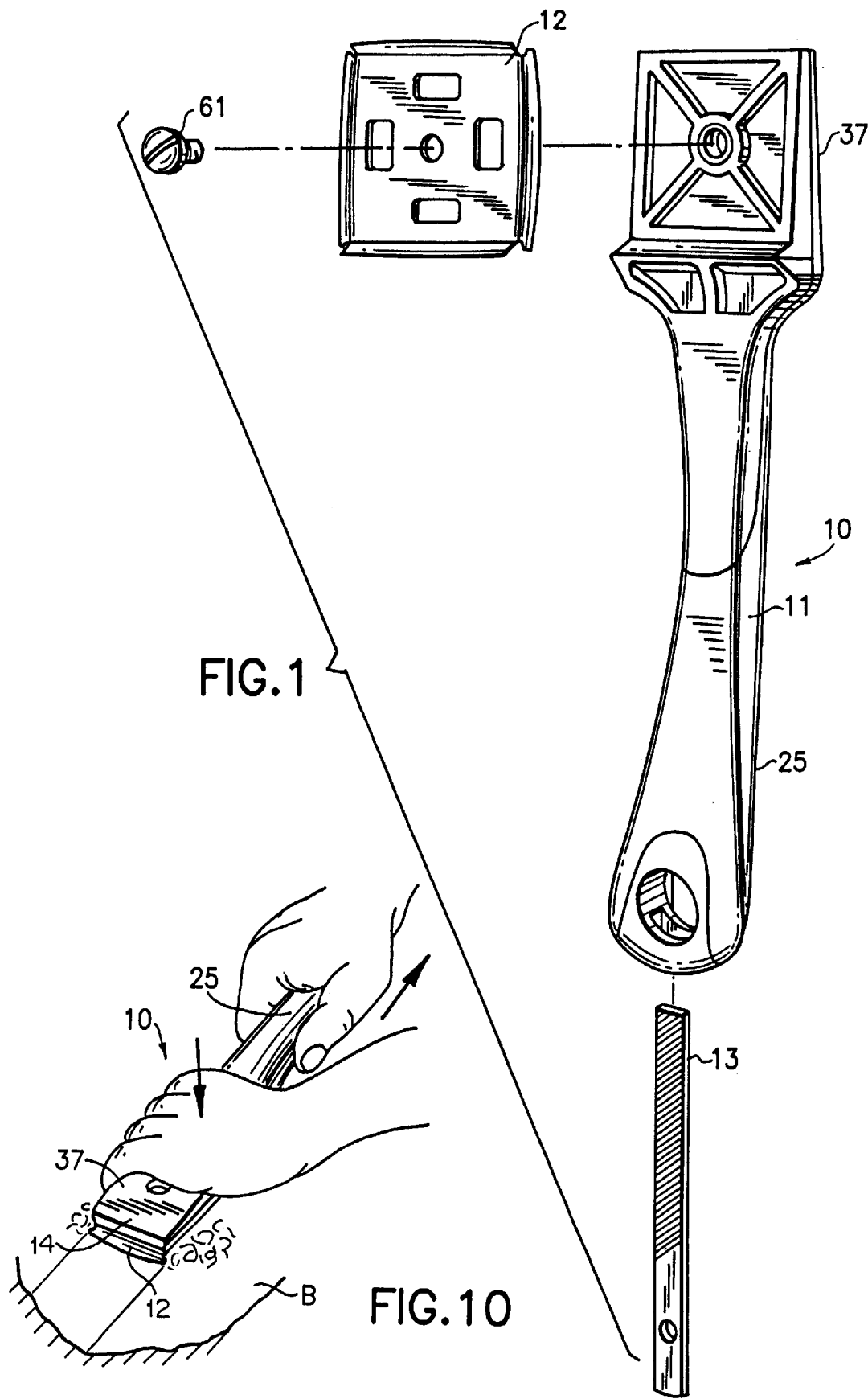

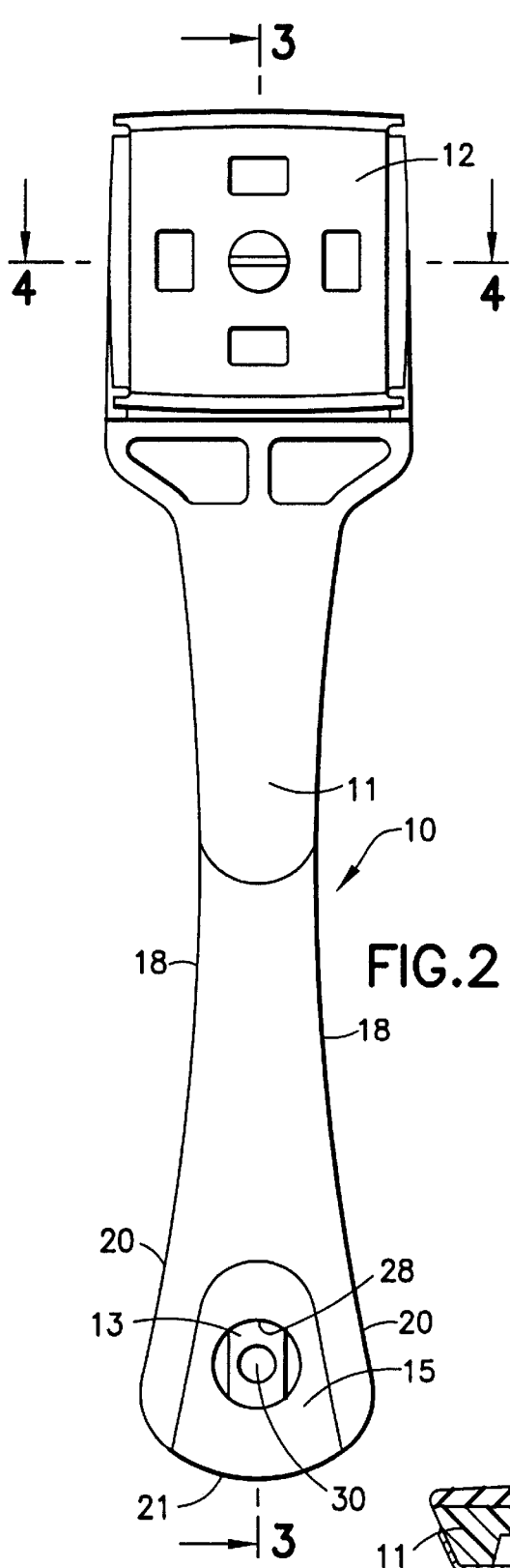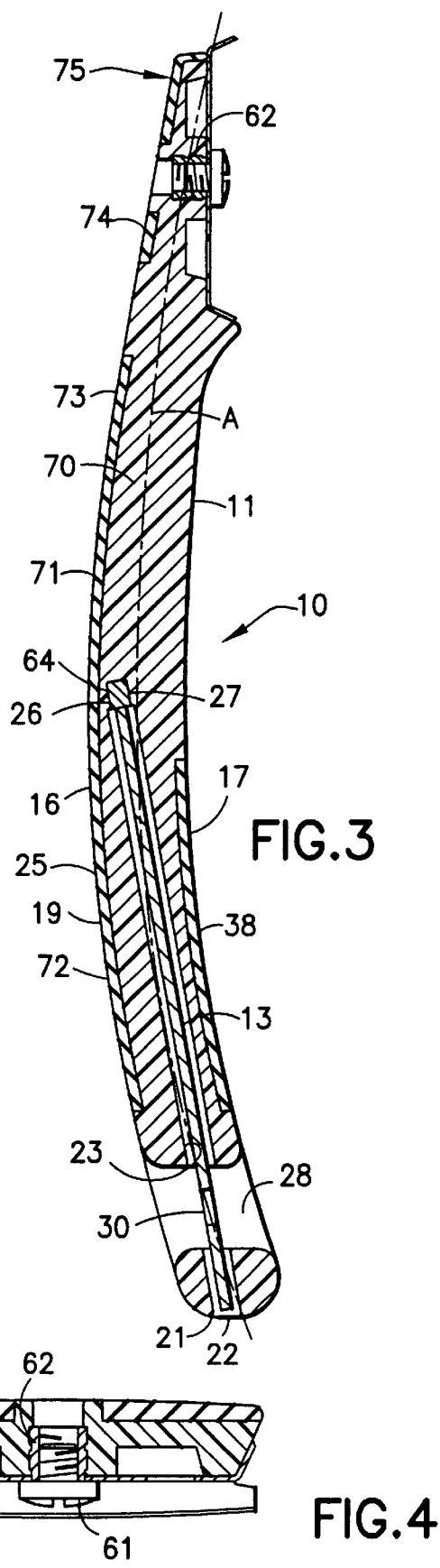

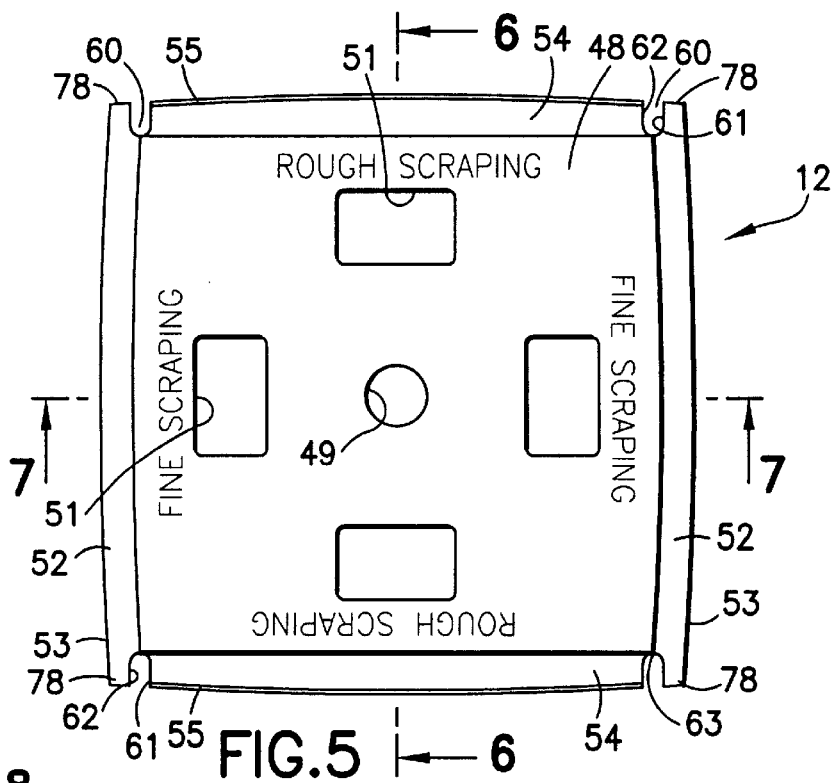
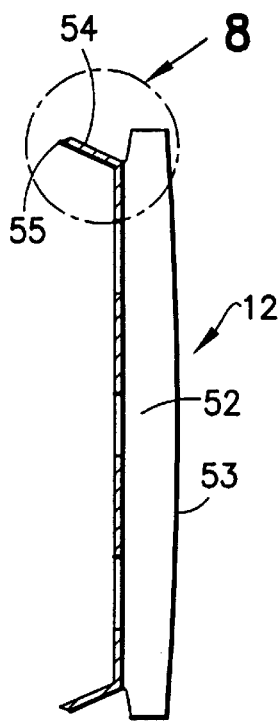
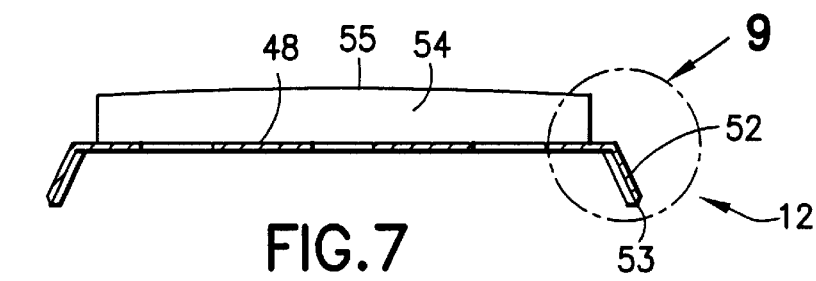
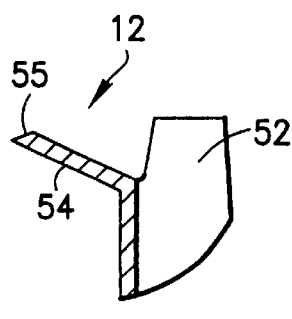
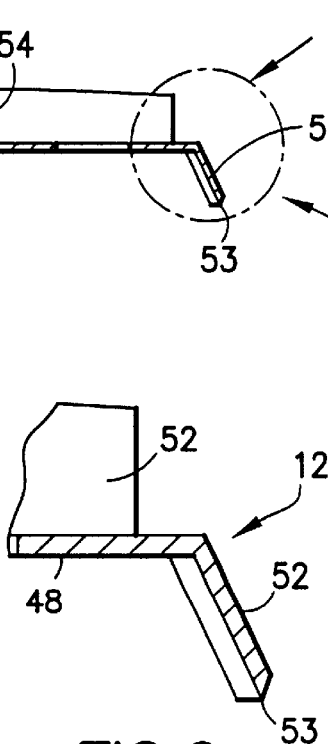

SCRAPER WITH STOWABLE FILE

BACKGROUND OF THE INVENTION

1. Field of the Invention

This invention relates to scrapers. This invention in another aspect relates to scrapers as combination tools. This invention also relates to ergonomic scraper handles.

2. Background and Discussion of the Prior Art

Prior art scrapers, and particularly wood scrapers, were constructed with elongated rectangular wooden handles or generally conical handles having a longitudinal axis which was in parallel disposition with the workpiece surface. The prior art handles were generally constructed of wood, metal, or hard plastic. Some prior art scraper handles had a rubber or vinyl grip.

Such prior art scraper handles are disclosed in U.S. Pat. No. 5,953,820, granted Sep. 21, 1999 to Vasudeva; U.S. Design Pat. No. 396,910, granted Aug. 11, 1998 to Henke; U.S. Pat. No. 5,850,657, granted Dec. 22, 1998 to List et al; U.S. Pat. No. 5,829,082, granted Nov. 3, 1998 to Morerra; and U.S. Design Pat. No. 394,534, granted May 19, 1998 to Coulter.

Scrapers with 4-way blades are disclosed in U.S. Pat. No. 2,783,537, U.S. Pat. No. 3,162,947 and U.S. Design Pat. No. 274,952 to Gringer, the applicant herein. Gringer '537 discloses 4-way blades with opposed blade pairs. The blades were bent with the blade edges being straight parallel to the bend line, with one pair of edges being serrated for coarse scraping. Gringer '947 discloses a scraper wherein the 4-way blade was mountable on opposite upper and lower mounts at the scraper distal end. The Gringer '947 handle was angled with respect to the distal mounting end to provide some measure of clearance particularly in one mounting mode. The Gringer '952 scraper had a mid handle raised flat planar metal grip construction.

These prior art handles caused fatigue in use, particularly with repetitive scraping. Further, where the user was operating with the blade at a shallow or acute angle with the workpiece surface, the user would often find that the knuckles would rub against the workpiece. This latter impediment was somewhat alleviated by the Gringer '952 handle.

Scrapers required frequent sharpening or filing of the scraper blade edge. This necessitated ready access to a file. The user would often have to cease work and locate a suitable file for the blade in use.

The early patent U.S. Pat. No. 822,928, granted in 1906 to Delano disclosed a file which was stored in the handle of the scraper. The file was only accessible by removal of a plug at the proximate end of the handle. A spring was disposed within the handle so that with removal of the plug, the spring would force the file out the proximate end. If the plug was lost or misplaced, the stowable feature was inoperable as the file would be forced out of the handle and fall out of the handle in use or in the vertical disposition.

The Gringer '952 scraper used a four way blade. Each of the blades was bent with respect to the central blade body. One pair of opposed blades were ground on a curve to provide a somewhat fine scraping action. The other pair of opposed blades were ground on the flat to provide a coarse scraping action.

The art desired improvements in the prior scrapers particularly as to improved comfort and reduced fatigue in repetitive scraping operations. The art also desired a broader range of scraping operations. The present invention provides these solutions.

The art also desired a scraper which eliminated the before-described Delano file stowage impediments.

It is therefore a principal object of the present invention to provide a scraper with ready file stowage and access.

It is another principal object of the present invention to provide a scraper with an ergonomic design handle for reduced fatigue.

It is, yet another object of the present invention to provide a scraper with improved blade angle control particularly for improved fine scraping action, as well as for coarse scraping action.

It is still a further object of the present invention to provide a scraper as aforesaid yet which is safe and practical in design and use.

SUMMARY OF THE INVENTION

The scraper has a handle with an arcuately curved elongated proximate end hand grip portion, and an enlarged upper distal end portion or surface. The handle proximate end is formed with a slot and recess to slidably receive a ferro-metallic file. A permanent high strength rare earth magnet is fixedly disposed in the handle recess to magnetically, hold and stow the file. The handle is formed with an enlarged vertically disposed opening or through hole so that the user can engage the stowed file through the handle hole to slidably forcibly remove the file from the handle for sharpening the scraper blade.

The user grips the arcuate grip portion with one hand and presses the enlarged upper distal end portion with the palm of the other hand so as to provide adjustable blade edge angular disposition and pressure. The specifically arcuately contoured handle permits controlled shallow or acute blade angle use without the user's knuckles contacting the workpiece surface.

The handle is constructed of a hard plastic core and over molded with a relatively soft elastomeric cover for a secure hand grip portion and other hand distal end engagement portion, which elastomeric cover complements the aforedescribed construction.

The scraper includes a four edged blade with improved fine scraping and rough scraping constructions. One set of oppositely disposed blades are bent with respect to the blade body with arcuately contoured edges, whereas the other set of oppositely disposed blades are bowed arcuately outwardly with respect to the blade body with like arcuately contoured blade edges, for respective coarse and fine scraping operations. The user, in conjunction with the aforesaid blade construction, varies the blade to workpiece angle for controlled fine and rough scraping actions.

BRIEF DESCRIPTION OF THE DRAWINGS

FIG. 1 is an exploded bottom perspective view of the scraper of the present invention;

FIG. 2 is a bottom plan view of the scraper of FIG. 1;

FIG. 3 is a sectional view taken along line 3—3 of FIG. 2;

FIG. 4 is a sectional view taken along line 4—4 of FIG. 2;

FIG. 5 is a top plan view of the scraper blade;

FIG. 6 is a sectional view taken along line 6—6 of FIG. 5;

FIG. 7 is a sectional view taken along line 7—7 of FIG. 5;

FIG. 8 is an enlarged fragmentary view of the blade edge of FIG. 6;

FIG. 9 is an enlarged fragmentary view of the blade edge of FIG. 7; and

FIG. 10 is a perspective view of the scraper in use.

DESCRIPTION OF THE PREFERRED EMBODIMENTS

Referring to the Figures, there is shown scraper 10 of the present invention. Scraper 10, in general, includes handle 11, four-way or four-edged blade 12, blade mounting screw 61, threaded molded in insert 62, ferro-metallic file 13, and magnet 26. Handle 11 has an enlarged distal end portion 14 and an elongated proximate end portion 15. Handle proximate end portion 15 has an upper surface 16, lower surface 17 and oppositely disposed arcuate or concave sides 18. Handle proximate end portion 15 has an elongated arcuately curved longitudinal axis A, and a proximately disposed arcuately curved convex or upper portion 19, which in conjunction with concave sides 18 and proximately disposed lower surface 38 provides hand grip portion 25.

Handle proximate end portion 15 has distally disposed outwardly flared surfaces 20 which are contiguous with distal end portion 14. Handle portion 15 is formed with a transversely disposed proximate distal end 21. Proximate end 21 is formed with slot 22 which extends distally to form rectilinear recess 23 with end wall 64. Recess 23 is sized to slidably receive file 13. Permanent magnet 26 is fixedly secured within handle 11 as at 27, so as to be transversely disposed to file 13. Magnet 26 magnetically holds file 13 within recess 23. Handle portion 15 is also formed with an enlarged vertically disposed contoured opening or through hole 28, whereby file 13, when disposed in recess 23 is viewable by and accessible to the user. In this manner of construction, the user's fingers engage file 13 through handle hole 28, and with a threshold minimum of force the user removes file 13 from recess 23 through distal end slot 22. Magnet 26 is preferably a rare earth metal magnet and has an energy product of at least about $6.0 \times 10^6$ gauss-oersteds. Such rare earth metal magnets are available from Hitachi Magnetics Corporation, Division of Hitachi Metals International, Ltd. under the style designations Hicorex 90A, 90B, 96A, 96B, 99A, and 99B. This high strength magnet is able to provide sufficient force to hold the file securely in the recess even with repetitive use of the scraper or with upward vertical disposition of the scraper. Indeed, with any less than the threshold removal force, the file can be only slightly moved in the proximate direction whereat the magnet pulls the file back into its recessed secured position. The user, to remove the file, must assert a force greater than the threshold force.

It is also noted that file 13 itself has a through hole 30 which is accessible with the file magnetically held and stowed within the handle. In this manner of construction, scraper 10 can be stored on a wall hook (not shown) with the hook engaging file hole 30 and through handle hole 28. This hole 30 also makes it easier for the user to remove file 13.

Handle distal end portion 14 has an enlarged generally rectilinear upper or top surface 37. In this manner of construction, the user grips hand grip portion 25 with one hand and presses the palm of other hand against surface 37 to provide leveraged controlled force contact of blade 12 against the wood work piece surface B, as best shown in FIG. 10. This arrangement and construction also permits improved control of the operating angle between respective edges 53 or 55 of blade 12 and workpiece surface B.

Referring specifically to FIGS. 6–9, there is shown the details of four edged blade 12. Blade 12 has a square central body 48 with a centrally disposed circular mounting hole 49 and four rectangular holes 51 (typical). Blade 12 is reversibly operably, four way mounted to handle 11 by screw 61 in handle threaded insert 62. A pair of opposed first blades 52 having edges 53 and a pair of opposed second blades 54 having edges 55 are formed on body 48. Blades 52 and 54 are bent in opposite directions with respect to body 48. Blades 54 are bent at 120 degrees with respect to body 48. Blades 52 are formed in a spoon shape with respect to blade body 48. Blades 52, unlike blades 54, are arcuately formed, as best illustrated by a comparison of the respective blade profiles in FIGS. 8 and 9. Blades 52 and 54 have common corners or recessed portions 60. Recessed portions 60 are, as viewed in FIG. 5, formed of respect parallel edges 61 and 62 and common curved recess 63. One pair of opposed blades 54 were folded flat before heat-treating and ground to a large radius of 17 to 23 degrees for rough or aggressive scraping. The other pair of opposed blades 52 were formed to a shallow spoon surface and also ground to a large radius of 17 to 23 degrees to offer fine scraping removal of one layer of paint at a time. Blades 52 have extended edges 78 to reach into corners. Blades 52 and 54 must be softer than Rockwell C 49 hardness to be filed with a file of Rockwell C 60 to 62 hardness.

It is important to note that proper paint scraping requires a curved or camber ground blade, so that the center of the blade attacks the wood more aggressively than the edges. This prevents gouging or damaging of the wood due to corner grooves from inexpensively ground flat blades. Blade edges 52 are formed to a spoon shaped curve and ground to a 17 to 23 inch radius. This achieves fine scraping as the rear handle 21 is lowered to the work. The spoon shape forming of these edges causes the blade to become flatter on the work as the tool is angled. Scraping is a pull action only. The scraper is never pushed.

Blade edges 54 are bent flat (not spoon shaped). They are used to remove many layers of paint during each pull stoke. The center of these blades are deeper than the center of the spoon shaped blades 55 and change little as the handle angle is brought down.

It is to be understood that the term "spoon shaped" or "spoon formed" as used herein refers to a blade which has an outwardly arcuate blade shape and a arcuate blade edge.

Handle 11 is formed from a hard thermoplastic core 70 and a molded over elastomeric cover 71, by means well known in the screwdriver and knife handle art. Cover 71 covers the proximately disposed hand grip portion 72 and the distally disposed cover-portions 73, 74 and 75, as best shown in FIGS. 3 and 10. This elastomeric cover in combination with the afore-described handle contoured construction contributes to the degree of comfort and control in the fine and coarse scraping actions. It is important to note that 70% of scraping requires downward force while 30% requires pulling force.

Scraping is an art. Choosing the right edge for the type of work to be done whether rough or fine, filling a sharp edge properly by following the angle and radius of the blade, and by varying the angle of scraping, all have an effect on the ease and finish of the job.

A properly scraped wood floor will leave a patina far superior and (less dusty) than a common drum sanded finish. A herringbone or parquet floor will have every board scraped with the grain instead of ½ the boards cross sanded and unaesthetic and without character when a drum sander is used.

While the foregoing describes one embodiment of the present invention, various modifications and changes are within the broad contemplation and scope of the invention as defined by the adjoined claims.

What is claimed is:

1. A scraper comprising:

an elongated handle, said handle having a top and a bottom, and a distal end and a proximate end;

a multiple edged blade, said blade having a body and at least one first blade being arcuate with respect to the body and having an arcuate ground edge and having at least one second blade being angled with respect to the body and having an arcuate ground edge;

means for removably attaching said blade to said handle distal end; said handle having a longitudinal axis extending from the distal end to the proximate end, said longitudinal axis being arcuate;

said handle proximate end comprising a grip for one hand;

said handle having a upper enlarged distal portion for receiving the palm of the other hand;

wherein the blade edges are disposed in a 17 to 23 inch radius, and wherein said first set of edges are spoon shaped and ground for fine scraping and said second set of edges being straight and flat and round to a 17 to 23 inch radius to scrape aggressively, to provide fine to coarse scraping operations.

2. The scraper of claim 1, said proximate end grip and said palm receiving distal end portion comprising an elastomeric portion.

3. A scraper comprising:

an elongated handle, said handle having a distal end and a proximate end;

a blade;

means for attaching said blade to said handle;

a file;

said handle having walls forming a recess for slidably removably receiving said file, said walls surround said file;

said handle proximate end being formed with a slot communicating with said recess, said slot being sized to slidably receive said file, and further comprising a magnet operably disposed in said handle recess to magnetically hold said file in said recess; and said handle being formed with a vertically disposed opening being sized so that a user's fingers can engage the file disposed within the handle recess to remove the file through the proximate end slot.

4. The scraper of claim 3, said file comprising a ferro-metallic construction.

5. The scraper of claim 3, said file being elongate and being formed with a through hole adjacent an end of the file, and wherein the file through hole is visibly disposed in the handle opening with the file magnetically held in the recess.

6. The scraper of claim 3, wherein the magnet comprises a rare earth metal magnet.

7. The scraper of claim 3, said handle having a longitudinal axis extending from the distal end to the proximate end, said axis being arcuate, and said handle having oppositely disposed sides, said sides comprising oppositely disposed arcuate concave surfaces.

* * * * *